United States Patent
Yamamura et al.

(10) Patent No.: US 6,623,036 B2
(45) Date of Patent: Sep. 23, 2003

(54) STEERING COLUMN ASSEMBLY FOR A VEHICLE

(75) Inventors: Mitsuji Yamamura, Shizuoka (JP); Kazuya Shibayama, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 59 days.

(21) Appl. No.: 10/041,561

(22) Filed: Jan. 10, 2002

(65) Prior Publication Data

US 2002/0089161 A1 Jul. 11, 2002

(30) Foreign Application Priority Data

Jan. 11, 2001 (JP) .................................. 2001-003391
Oct. 22, 2001 (JP) .................................. 2001-323453

(51) Int. Cl.⁷ ............................................. B62D 1/18
(52) U.S. Cl. ..................................... 280/775; 74/493
(58) Field of Search ............................... 280/777, 779, 280/775; 74/493; 464/140, 162

(56) References Cited

U.S. PATENT DOCUMENTS

| 5,025,679 | A | * | 6/1991 | Yamamoto | 74/493 |
| 5,199,319 | A | | 4/1993 | Fujiu | |
| 5,605,351 | A | | 2/1997 | Higashino | 280/775 |
| 6,036,228 | A | * | 3/2000 | Olgren et al. | 280/775 |
| 6,450,531 | B1 | * | 9/2002 | Rinker et al. | 280/775 |
| 6,467,807 | B2 | * | 10/2002 | Ikeda et al. | 280/775 |

FOREIGN PATENT DOCUMENTS

| EP | 0 611 690 | 8/1994 |
| FR | 2 784 343 | 4/2000 |
| GB | 1 287 269 | 8/1972 |
| GB | 2 247 652 | 3/1992 |
| JP | 56-110065 | 8/1981 |
| JP | 58-33368 | 3/1983 |
| JP | 60-179576 | 11/1985 |
| JP | 6-156286 | 6/1994 |
| JP | 8-230689 | 9/1996 |

* cited by examiner

Primary Examiner—Paul N. Dickson
Assistant Examiner—Faye M. Fleming
(74) Attorney, Agent, or Firm—Foley & Lardner (57) ABSTRACT

A steering column assembly includes a column jacket provided with upper and lower jacket tubes telescopically coupled with each other for supporting therein a steering shaft rotatably. The column jacket is mounted tiltably on a vehicle body by upper and lower clamps and received between sidewalls of the upper clamp through distance brackets. One of the distance brackets includes lock protrusions that face the outer surface of the upper jacket tube, while the other includes support protrusions that face the outer surface of the lower jacket tube. When an operation lever is set to a lock position, the sidewalls is caused to press the distance brackets against the column jacket with the lock protrusions pushed on the upper jacket tube and the support protrusions pushed on the lower jacket tube. In this state, the column jacket is prevented from tilting and telescoping.

21 Claims, 12 Drawing Sheets

FIG.14

STEERING COLUMN ASSEMBLY FOR A VEHICLE

BACKGROUND OF THE INVENTION

The present invention relates to a tilting and telescopic steering column assembly for a vehicle.

A tilting and telescopic steering column assembly includes a tilt mechanism for appropriately adjusting an angle of inclination of a steering wheel (i.e., a vertical position of the steering wheel), a telescoping mechanism for appropriately adjusting an axial position of the steering wheel (i.e., a fore-and-aft position of the steering wheel), and a lock mechanism or lock mechanisms for rendering the tilt and telescoping mechanisms inoperative and thereby locking the steering wheel at an adjusted position.

SUMMARY OF THE INVENTION

At present, there are some types of tilting and telescopic steering column assemblies.

One type of tilting and telescopic steering column assembly includes a column jacket provided with upper and lower jacket tubes for supporting therein a steering shaft. The upper jacket tube is slidably inserted in the lower jacket tube so that the column jacket can telescope together with the steering shaft. In such a tilting and telescopic steering column assembly, two separate lock mechanisms are provided: one is exclusive to a tilt mechanism and the other is exclusive to a telescoping mechanism. The steering column assembly thus requires a large number of parts, which results in a significant increase in the weight and manufacturing cost of the steering column assembly.

Another type of tilting and telescopic steering column assembly has a single lock mechanism that combines the above two lock mechanisms, i.e., capable of rendering both of tilt and telescoping mechanisms inoperative using a single operation lever. However, this type of steering column assembly cannot always attain sufficient support rigidity of the telescopic section of a column jacket due to structural restrictions. In addition, the lock mechanism has a complicated structure.

It is therefore an object of the present invention to provide a tilting and telescopic steering column assembly provided with a telescopic column jacket, which can make its tilt and telescoping mechanisms locked or unlocked simultaneously in a single operation step and presents the following features (1) to (3).

(1) The steering column assembly has a simple structure built up of a smaller number of parts, whereby its manufacturing cost can be reduced.

(2) The steering column assembly can attain improved strength of locking a steering wheel at an adjusted position.

(3) The steering column assembly can attain sufficient support and dynamic rigidity, especially of the telescopic column jacket.

According to one aspect of the present invention, there is provided a steering column assembly for a vehicle, comprising: a column jacket having upper and lower jacket tubes telescopically coupled with each other; a steering shaft rotatably supported in the column jacket and capable of tilting and telescoping together with the column jacket; upper and lower clamps mounting the column jacket on a vehicle body in such a manner that the column jacket can tilt about a lower end portion of the lower jacket tube, the upper clamp having a pair of opposed sidewalls and first and second distance brackets disposed movably between the sidewalls so as to sandwich the column jacket therebetween, the first distance bracket including a lock portion engageable with an outer surface of the upper jacket tube, the second distance bracket including a support portion engageable with an outer surface of the lower jacket tube; and an operation lever attached to the upper clamp so as to be able to pivot between a lock position and an unlock position, wherein, when the operation lever is at the lock position, the sidewalls is caused to press the first and second distance brackets against the column jacket with the lock portion pushed on the upper jacket tube and the support portion pushed on the lower jacket tube so that both of the column jacket and the steering shaft are prevented from tilting and telescoping.

According to another aspect of the present invention, there is provided a steering column assembly for a vehicle, comprising: a column jacket having upper and lower jacket tubes telescopically coupled with each other and supporting therein a steering shaft rotatably; a clamp mounting the column jacket tiltably on a vehicle body, the clamp having a pair of opposed sidewalls and first and second distance brackets disposed movably between the sidewalls so as to sandwich the column jacket therebetween, the first distance bracket having a lock portion engageable with an outer surface of the upper jacket tube, the second distance bracket having a support portion engageable an outer surface of the lower jacket tube; and control means for pushing the sidewalls thereby pressing the first and second distance brackets against the column jacket with the lock portion pushed on the upper jacket tube and the support portion pushed on the lower jacket tube so that the column jacket is prevented from tilting and telescoping when an operation lever is in a lock position.

According to still another aspect of the present invention, there is provided a clamp for mounting a column jacket tiltably on a vehicle body, the column jacket having upper and lower jacket tubes telescopically coupled with each other, the clamp comprising: a pair of opposed sidewalls; first and second distance brackets disposed movably between the sidewalls so as to sandwich the column jacket therebetween, the first distance bracket including a lock portion engageable with an outer surface of the upper jacket tube, the second distance bracket including a support portion engageable with an outer surface of the lower jacket tube; and control means for pushing the sidewalls thereby pressing the first and second distance brackets against the column jacket with the lock portion pushed on the upper jacket tube and the support portion pushed on the lower jacket tube so that the column jacket is prevented from tilting and telescoping when an operation lever is in a lock position.

DESCRIPTION OF THE PREFERRED EMBODIMENTS

An explanation will be given of a tilting and telescopic steering column assembly according to the present invention based on the following preferred embodiments.

Firstly, a tilting and telescopic steering column assembly according to a first embodiment will be described with reference to FIGS. 1 to 5.

The steering column assembly of the first embodiment includes a tubular column jacket 1, a steering shaft 10 supported rotatably in the column jacket 1 via a bearing 8 and a resinous bearing 9, upper and lower clamps 6 and 7 mounting the column jacket 1 on a vehicle body 200, a lock bolt 17, and an operation lever 16 attached to the lock bolt 17 together with a cam follower 34 and a cam 35.

As shown in FIGS. 1 to 4, the column jacket 1 has a lower jacket tube 2 and an upper jacket tube 5 slidably inserted in the lower jacket tube 5 via resinous bushings 3 and 4. Further, a mounting bracket 24 is welded to the upper jacket tube 5 for fitting thereto an auxiliary equipment.

Figure 1:
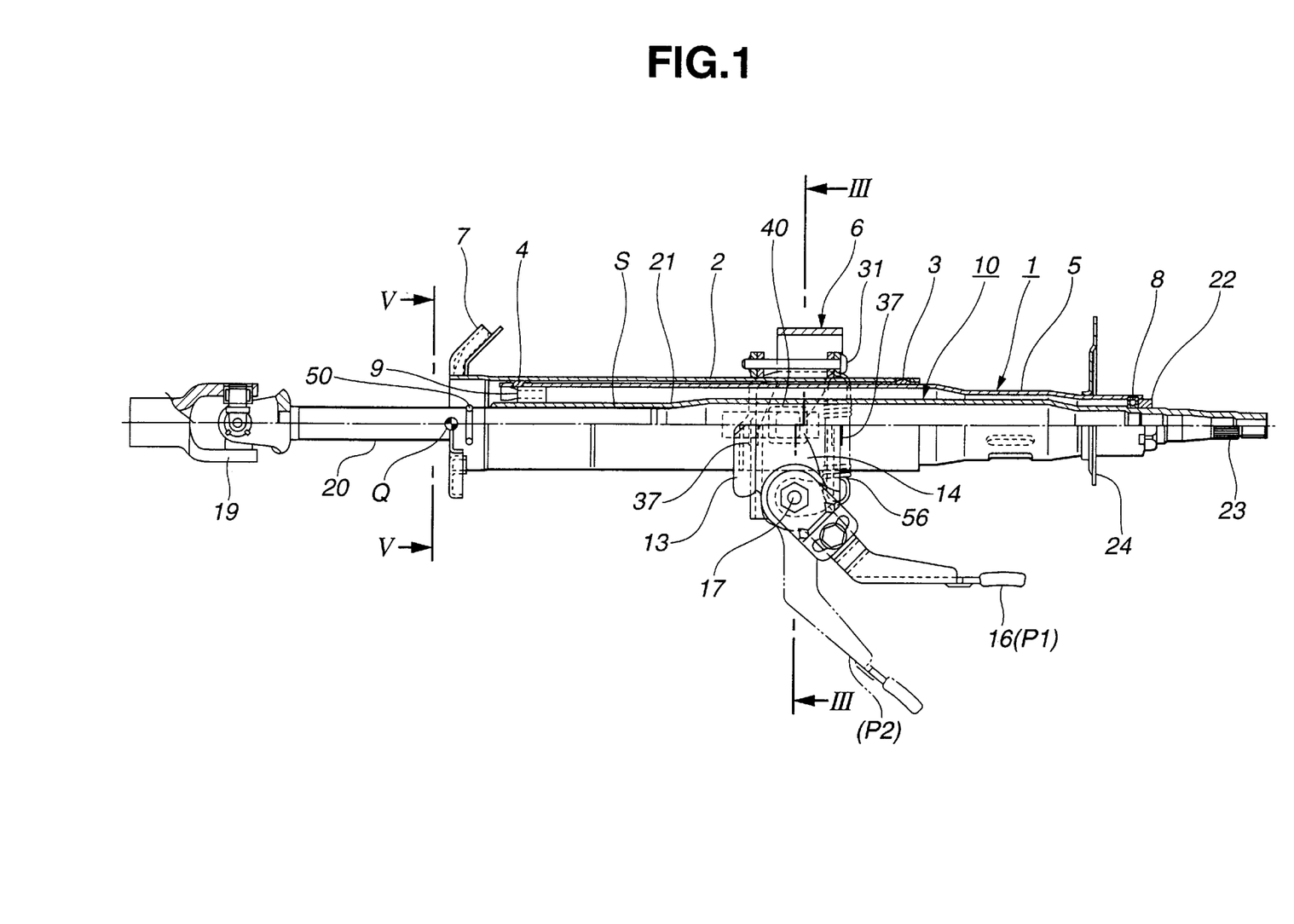
FIG. 1 is a half sectional view of a tilting and telescopic steering column assembly according to a first embodiment of the present invention.
Figure 2:
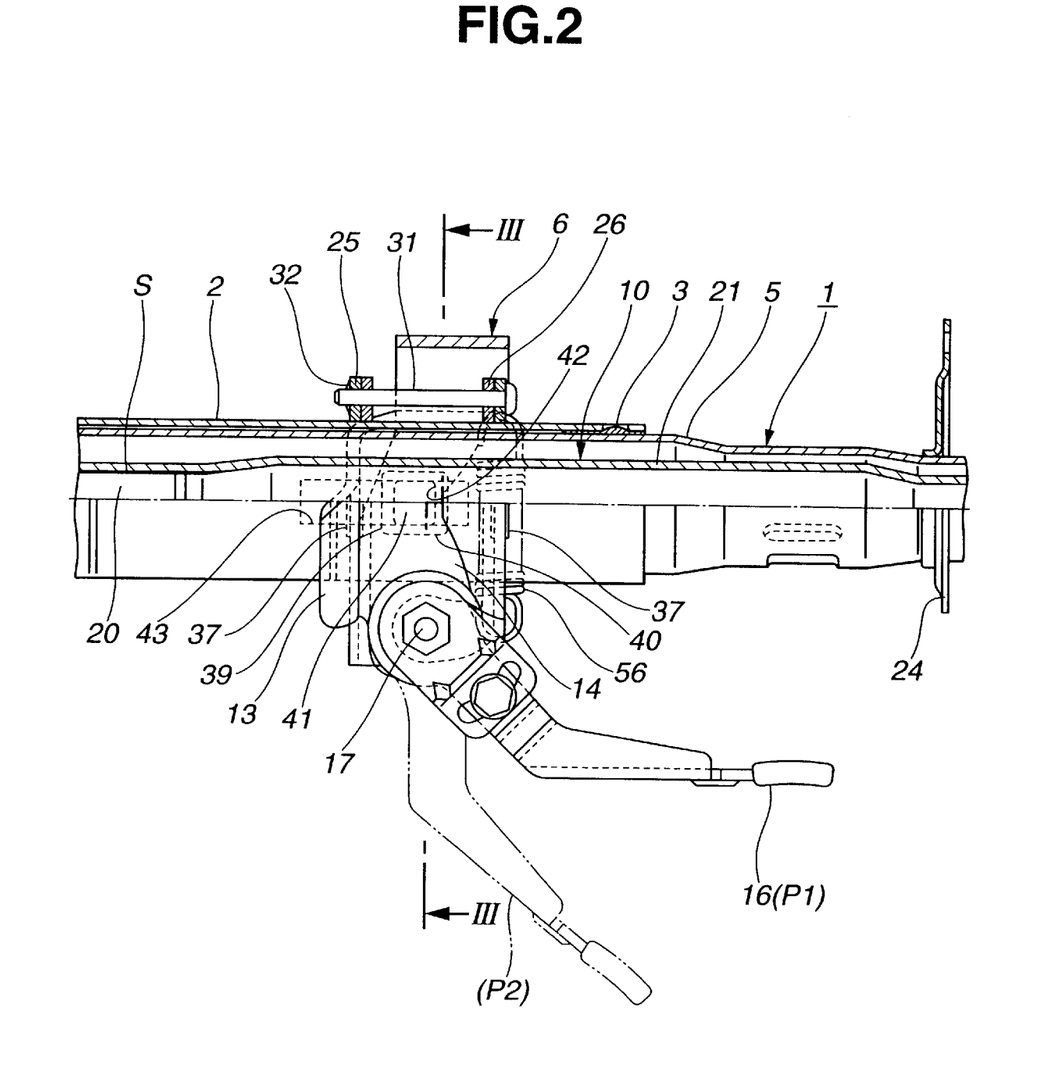
FIG. 2 is a partially enlarged view of the tilting and telescopic steering column assembly of FIG. 1.

The steering shaft 10 has a lower shaft member 20, which may be solid or hollow, and a tubular upper shaft member 21, as shown in FIGS. 1 and 2. Splines are formed on the outer surface of the lower shaft member 20 throughout its length and on the inner surface of a lower portion of the upper shaft member 21. The upper and lower shaft members 21 and 20 are thus slidably engaged with each other by means of the splines (hereinafter referred to as a spline section S). Further, the upper shaft member 21 is coupled to the upper jacket tube 5 by a locknut 22 and the bearing 8 so that the upper shaft member 21 and the upper jacket tube 5 are rotatable but not movable axially of the column jacket 1 relative to each other. The lower shaft member 20 is coupled at a lower end thereof to a steering gear unit (not shown) through a universal joint 19. A steering wheel (not shown) is attached to a serrated upper end portion 23 of the upper shaft member 21.

Figure 5:
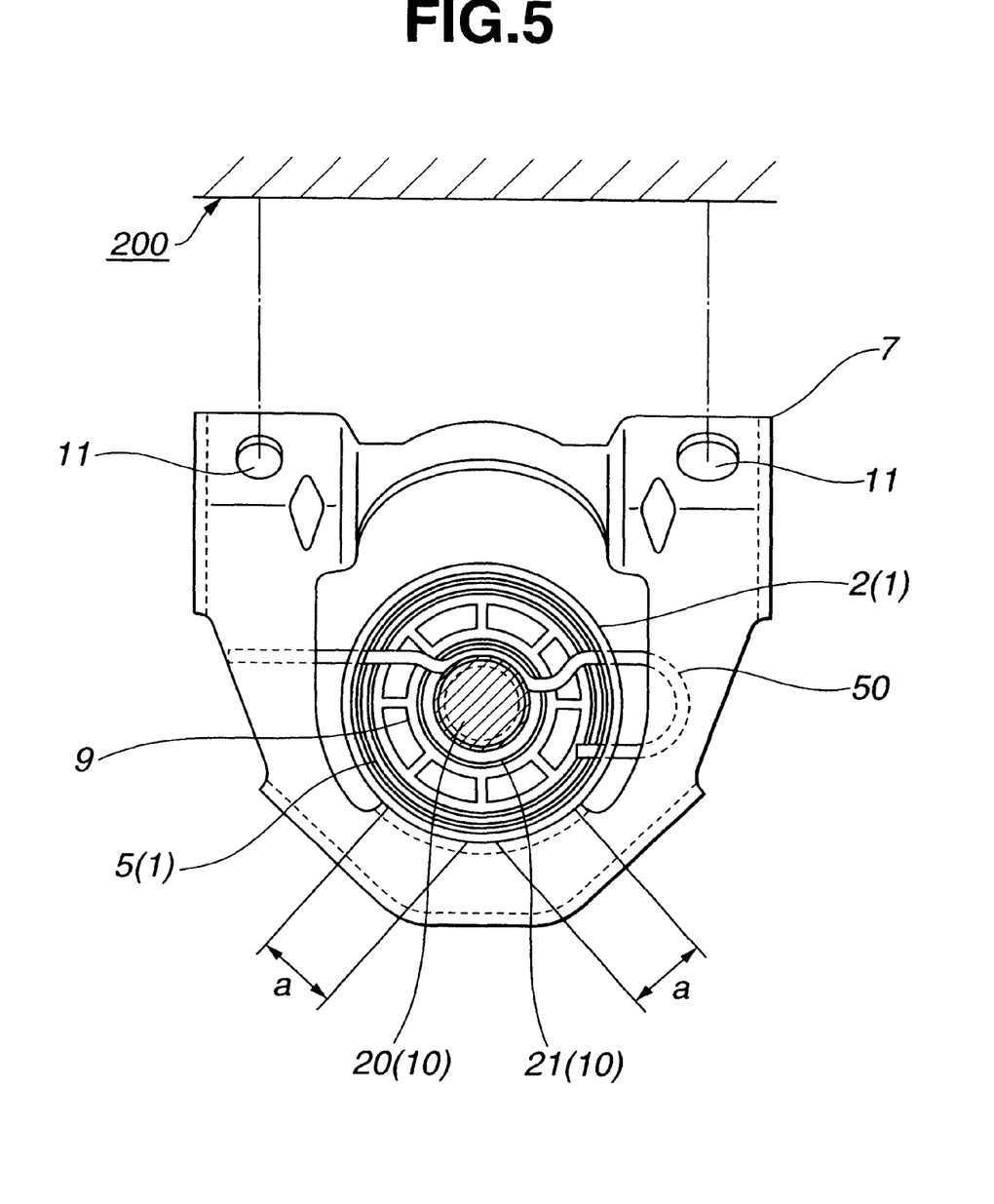
FIG. 5 is a sectional view of the tilting and telescopic steering column assembly when taken along a line V—V of FIG. 1.

The lower clamp 7 is generally ring-shaped so as to allow the column jacket 1 to extend therethrough, as shown in FIG. 5. The lower clamp 7 is fixed to the vehicle body 200 by bolts (not shown) inserted into bolt holes 11 of the lower clamp 7, whereas the inner surface of a lower end portion of the lower clamp 7 is attached partly (e.g., at sections a shown in FIG. 5) to a lower end portion of the lower jacket tube 2 by welding. The lower jacket tube 7 thus allows the column jacket 1 to pivot about a hinge point Q, i.e., tilt under the effect of the elasticity or resiliency thereof. The hinge point Q is located at the lower end portion of the lower clamp 7.

On the other hand, the upper clamp 6 includes a mounting plate 13 generally formed with a U-shaped central portion and L-shaped side portions, as shown in FIGS. 1 to 4. The upper clamp 6 is also fixed to the vehicle body 200 by bolts (not shown) inserted into elongated bolt holes 12 of the mounting plate 13.

The upper clamp 6 further includes a pair of opposed sidewalls 14, 15 formed by bending and a pair of distance brackets 25, 26.

The sidewalls 14, 15 receive the column jacket 1 therebetween and are resiliently deformable under pressure so as to get closer to each other. Tilt adjustment holes 18 are formed in the respective sidewalls 14, 15 and elongated in a vertical direction.

The distance brackets 25, 26 are generally U-shaped by bending and disposed movably between the sidewalls 14, 15 so as to sandwich the column jacket 1 between their inner surfaces. The distance brackets 25, 26 include webs 27, 28 that abut on the sidewalls 14, 15, pairs of flanges 29, 30 and circular holes 25a, 26a formed in the webs 27, 28, respectively. The distance brackets 25, 26 are coupled by a pin 31 and a push nut 32 so as to be able to get closer to each other upon deformation of the sidewalls 14, 15. Herein, the pin 31 is positioned on the vehicle body side (i.e., the upper side in FIG. 1) of the column jacket 1.

Figure 3:
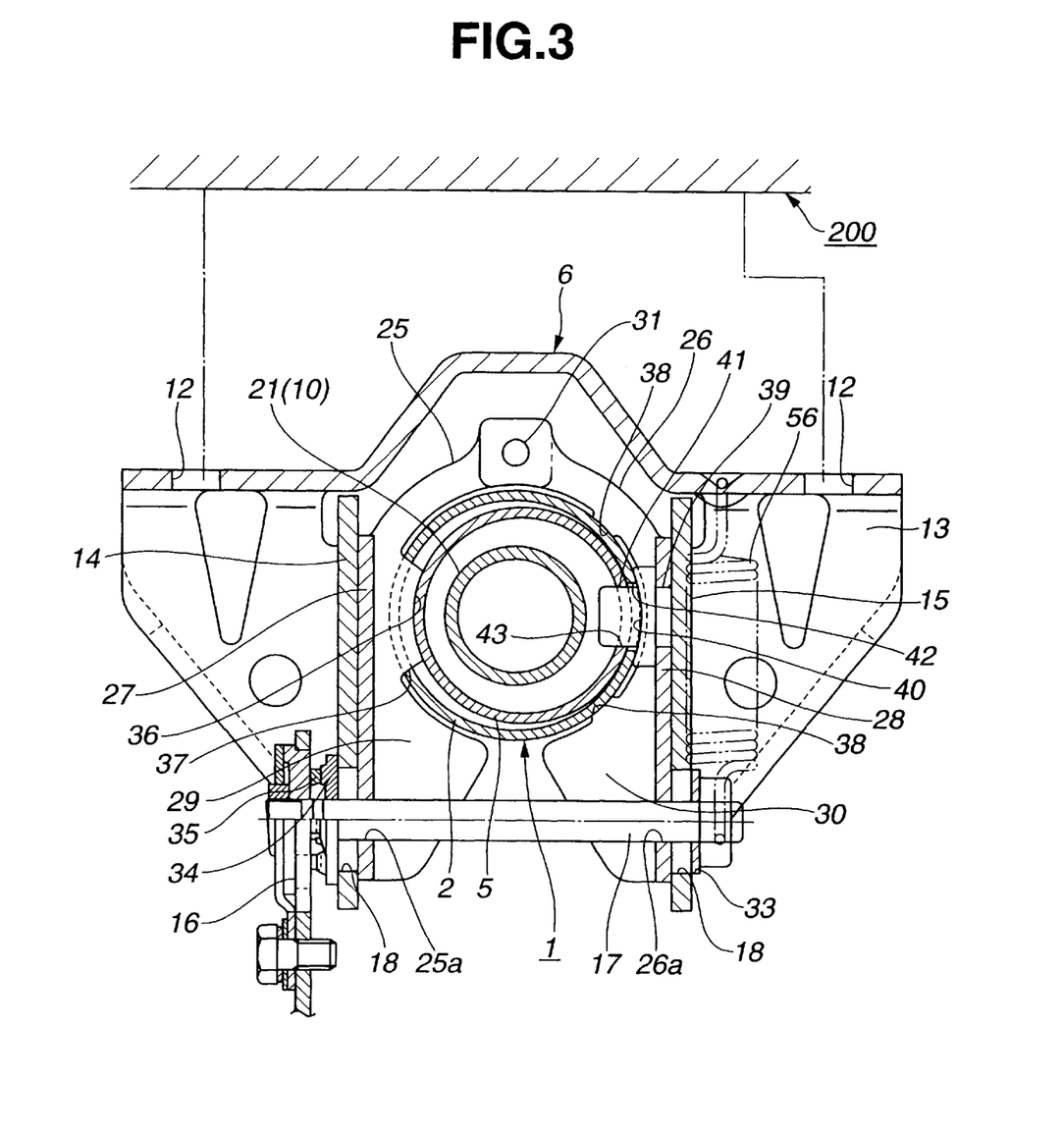
FIG. 3 is a sectional view of the tilting and telescopic steering column when taken along a line III—III of FIGS. 1 and 2.
Figure 4:
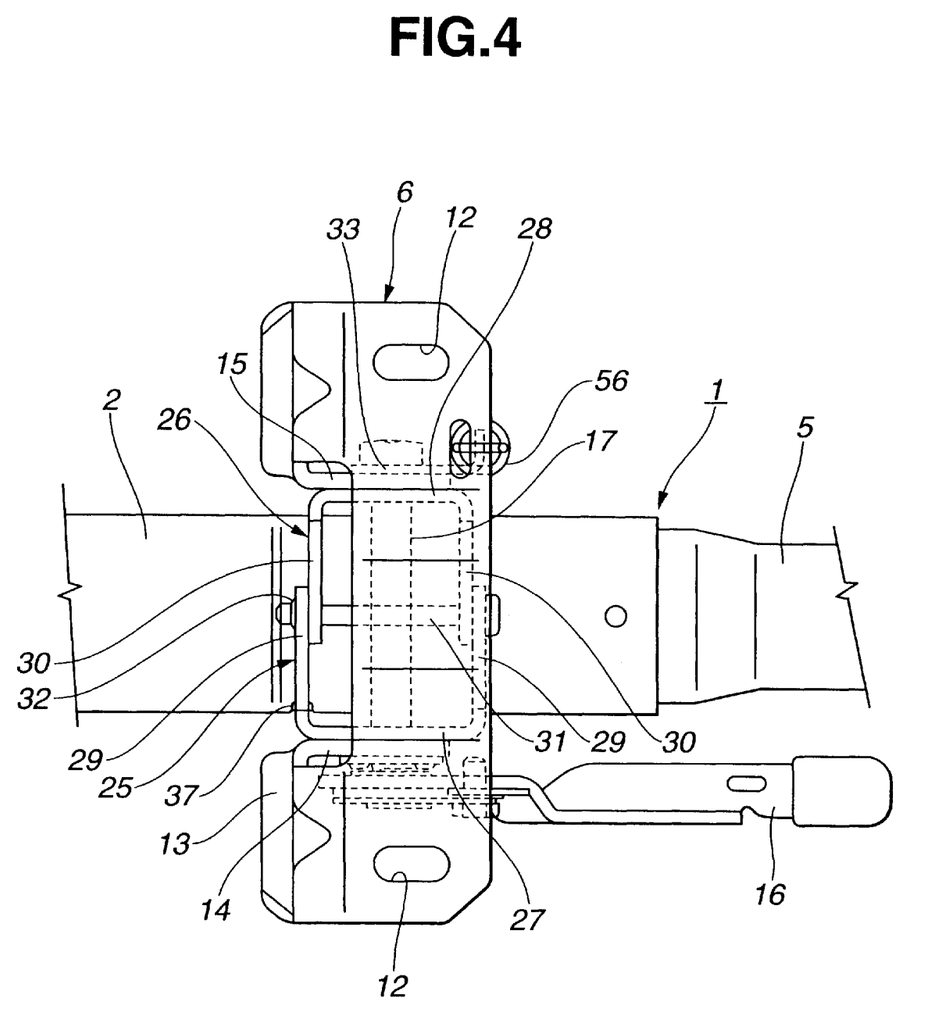
FIG. 4 is a top view of the tilting and telescopic steering column assembly of FIG. 2.

Each of the flanges 29 includes a lock protrusion 36 formed thereon so that the lock protrusions 36 are spaced apart in the axial direction of the column jacket 1, as shown in FIG. 3. The lock protrusions 36 have curved surfaces that fit the outer surface of the upper jacket tube 5, and are brought directly into contact with the upper jacket tube 5 through slits 37 formed in the lower jacket tube 2.

Similarly, each of the flanges 30 includes a pair of support protrusions 38 formed thereon so that the support protrusions 38 of one flange 30 and those of the other flange 30 are spaced apart in the axial direction of the column jacket 1. The support protrusions 38 are brought directly in contact with the outer surface of the lower jacket tube 2.

As shown in FIGS. 1 to 3, a stopper block 39 is press fitted in the web 28 of the distance bracket 26. The stopper block 39 is generally rectangular in cross-section, and includes a curved surface 40 that fits the outer surface of the lower jacket tube 2 and a guide protrusion 41 shaped into a rectangular shaft. The guide protrusion 41 protrudes into the inside of the lower jacket tube 2 through a rectangular hole 42 of the lower jacket tube 2, and is engaged in a rectangular telescoping adjustment hole 43 formed in the upper jacket tube 5. The rectangular hole 42 is made slightly larger than the guide protrusion 41. The telescoping adjustment hole 43 is made adequately longer in the axial direction than the guide protrusion 41. Thus, the upper jacket tube 5 is movable in the axial direction of the column jacket 1 relative to the lower jacket tube 2 within the range determined by the guide protrusion 41 and the telescoping adjustment hole 43.

In the above-mentioned structure, the engagement between the upper and lower jacket tubes 5 and 2 is subject to only a few structural restrictions. Accordingly, it is possible to secure the engagement between the upper and lower jacket tubes 5 and 2 as much as possible and thereby possible to improve on support and dynamic rigidity of the column jacket 1.

As shown in FIGS. 1 to 4, the lock bolt 17 is provided so as to pass through the tilt adjustment holes 18 of the sidewalls 14, 15 and the circular holes 25a, 26a of the distance brackets 25, 26 on the driver side (the lower side in FIG. 1) of the column jacket 1. When the lock bolt 17 is moved within the elongated tilt adjustment holes 18, the distance brackets 25, 26 shift up and down between the sidewalls 14, 15 and make the column jacket 1 pivot in the vertical direction.

Further, a washer 33 is generally L-shaped and interposed between the sidewall 15 and the head of the lock bolt 17. A torsion coil spring 56 is arranged with some tension between the mounting plate 13 and the washer 33 so as to urge the column jacket 1 to pivot upwardly about the hinge point Q.

The operation lever 16 is attached to the lock bolt 17 so as to pivot between a lock position P1 and an unlock position P2 (shown in FIG. 2). The cam follower 34 and the cam 35 are interposed between the sidewall 14 and the operation lever 16 with their cam surfaces contacted in such a manner that the cam follower 34 is mounted on the lock bolt 17 for rotation together therewith and the cam 35 is rotatably fixed to the operation lever 16.

Using the above-described steering column assembly, every driver can adjust the position of the steering wheel at one's discretion by tilting and telescoping the steering shaft 10 together with the column jacket 1. After the position adjustment, the steering wheel is locked at an adjusted position by setting the operation lever 16 to the lock position P1.

When the operation lever 16 is moved into the lock position P1, a cam motion is created due to the contact between the cam follower 34 and the cam 35. The cam motion creates pressure on the sidewalls 14, 15 and causes the sidewalls 14, 15 to become deformed and be pushed on the distance brackets 25, 26. Then, the distance brackets 25, 26 get close to each other to clamp the column jacket 1. The column jacket 1 thus becomes unable to pivot about the hinge point Q.

At the same time, the lock protrusions 36 and the support protrusions 38 are pressed against the outer surface of the upper jacket tube 5 and the outer surface of the lower jacket tube 2, respectively. The upper and lower jacket tubes 5 and 2 shift relatively in a radial direction of the column jacket 1 so that the outer surface of the upper jacket tube 5 and the inner surface of the lower jacket tube 2 are pressed against each other at one point. The upper jacket tube 5 thus becomes unable to move in the axial direction of the column jacket 1 relative to the lower jacket tube 2.

As the lock protrusions 36 are spaced apart in the axial direction, the upper jacket tube 5 can be pressed firmly with the lock protrusions 36 and thus locked. The lower jacket tube 2 can be also pressed firmly with the support protrusions 38, as the support protrusions 38 are spaced apart in the axial direction. It is therefore possible to prevent the upper jacket tube 5 from moving in the axial direction relative to the lower jacket tube 2 more reliably.

The column jacket 1 can be prevented from tilting and telescoping as described above. Herein, the steering shaft 10 tilts and telescopes together with the column jacket 1. In other words, the steering shaft 10 can be prevented from tilting and telescoping as long as the column jacket 1 is prevented from tilting and telescoping.

It is now assumed that the steering wheel is to be controlled by force even though a steering lock device (not shown) is actuated. The steering lock device is used for preventing vehicle robbery during parking, and actuated by demounting an ignition key to rock the steering. Torsional torque caused by such control force is transmitted from the upper shaft member 21 through the upper jacket tube 5, the telescoping adjustment hole 43, the guide protrusions 41 and the webs 28 to the sidewall 15. Then, the torsional torque is distributed from the sidewall 15 to the upper clamp 6 and to the vehicle body 200 so that the vehicle body 200 absorbs the torsional torque. It becomes therefore possible to attain sufficient strength of steering lock.

At the time the position of the steering wheel is adjusted according to drive's taste, the operation lever 16 is set to the unlock position P2.

When the operation lever 16 is moved into the unlock position P2, the pressure on the sidewalls 14, 15 caused due to the cam motion is cancelled. Both of the sidewalls 14, 15 and the distance brackets 25, 26 return to their original positions due to their elasticity or resilience. The column jacket 1 thus becomes able to pivot about the hinge point Q by moving the lock bolt 17 within the tilt adjustment holes 18.

Simultaneously, the lock protrusions 36 and the support protrusions 38 are released from being pressed to the upper jacket tube 5 and the lower jacket tube 2, respectively, without the lock protrusions 36 fell out of the slits 37. The upper jacket tube 5 thus becomes movable in the axial direction relative to the lower jacket tube 2, while the guide protrusion 41 engaged in the telescoping adjustment hole 43 prevents excessive axial movement of the upper jacket tube 5.

When the column jacket 1 tilts and telescopes as described above, the steering shaft 10 also tilts and telescopes together with the column jacket 1 so as to adjust the position of the steering wheel.

As described above, the tilting and telescopic steering column assembly of the first embodiment can make its tilt and telescoping mechanisms locked or unlocked in a single operation step, and at the same time, has a simple structure with a smaller number of parts. It is therefore possible to reduce the weight and manufacturing cost of the steering column assembly. Further, the tilting and telescopic steering column assembly can attain improved strength of locking the steering wheel and support and dynamic rigidity of the column jacket 1.

Herein, a stopper pin 50 is inserted into the lower shaft member 20, as shown in FIGS. 1 to 5. The stopper pin 50 is shaped like a wire spring and coupled to the lower clamp 7 for preventing the lower shaft member 20 from falling off from the steering column assembly in the process of distributing the steering column assembly. The stopper pin 50 is taken away when the steering column assembly is attached to the vehicle body 200.

Next, a tilting and telescopic steering column assembly according to a second embodiment of the invention will be described with reference to FIGS. 6 to 14. As to a discussion relating the structure and function of the second embodiment, the same should be apparent from the above description. Accordingly, like parts and components are designated by the same reference numerals in the drawings thereby avoiding duplicating description.

Figure 6:
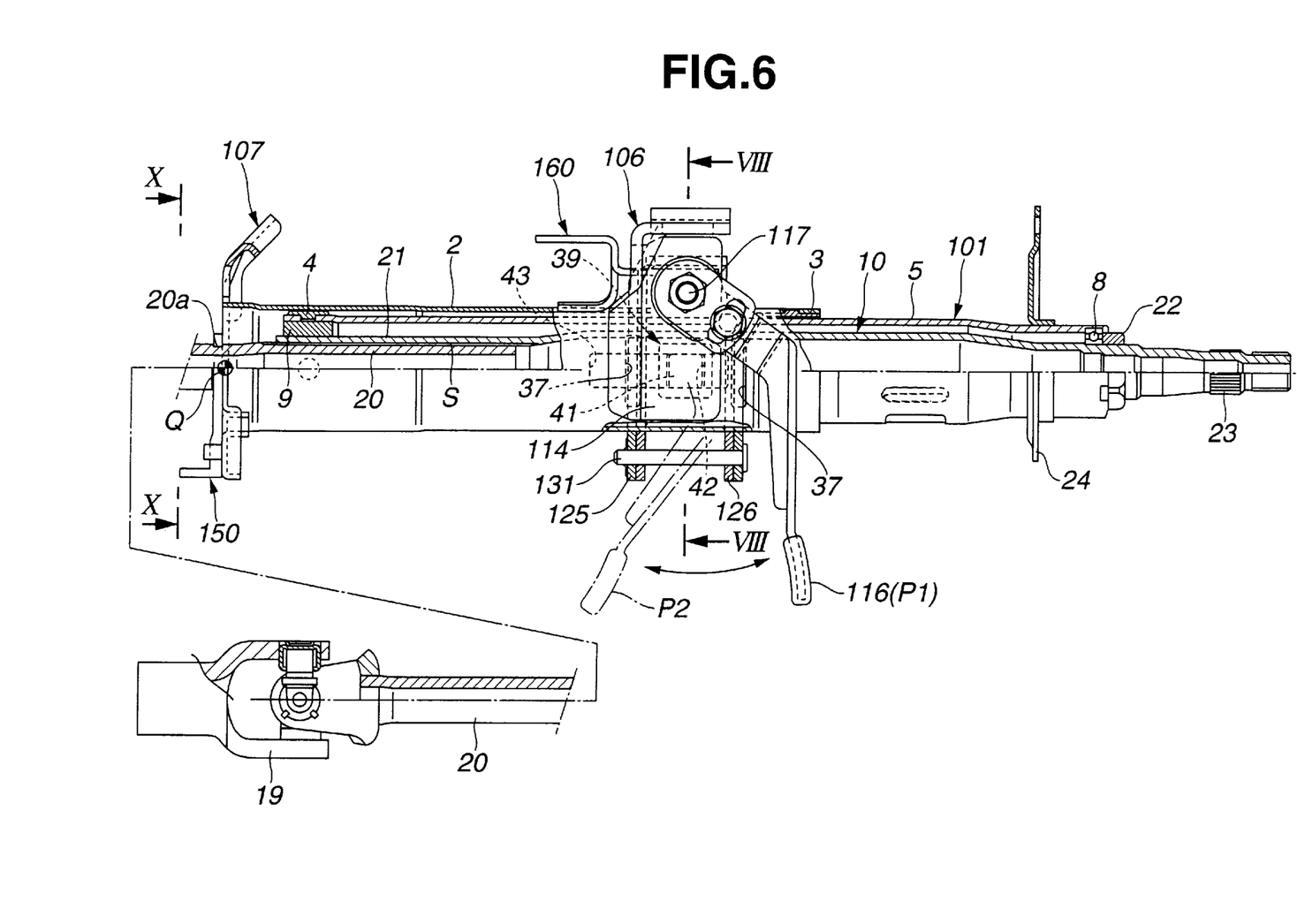
FIG. 6 is a half sectional view of a tilting and telescopic steering column assembly according to a second embodiment of the present invention.

In the steering column assembly of the second embodiment, a column jacket 101 is mounted on the vehicle body 200 by upper and lower clamps 106 and 107.

Figure 10:
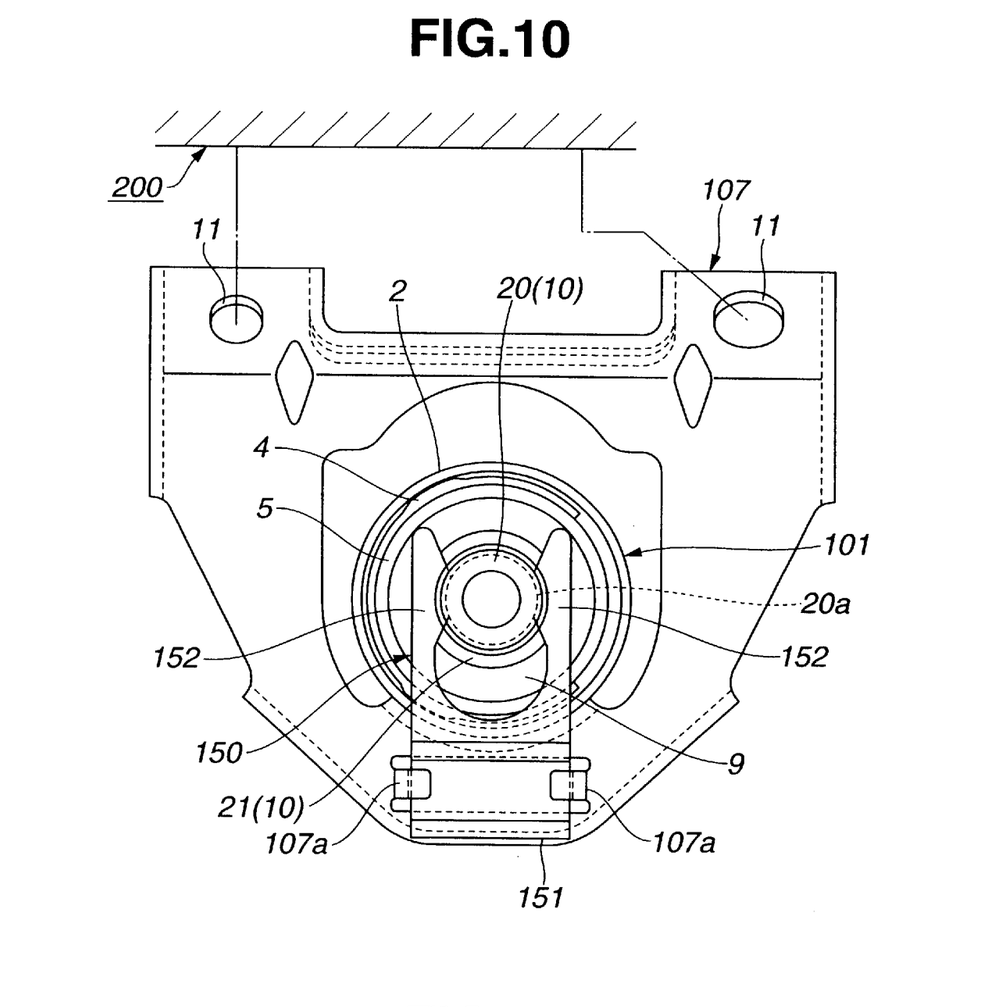
FIG. 10 is a sectional view of the tilting and telescopic steering column assembly when taken along a line X—X of FIG. 6.

The lower clamp 107 is generally ring-shaped so as to support the column jacket 101 therethrough and provided with hook portions 107a, as shown in FIG. 10. The inner surface of a lower end portion of the lower clamp 107 is attached at least partly to a lower end portion of the lower jacket tube 2 by welding. The column jacket 101 can therefore pivot about the hinge point Q due to its elasticity or resiliency. The hinge point Q is located at the lower end portion of the lower clamp 107.

The upper clamp 106 includes a pair of opposed sidewalls 114, 115 and a pair of distance brackets 125, 126, as shown in FIGS. 6 to 9.

The sidewalls 114, 115 receive the column jacket 101 therebetween, and are resiliently deformable under pressure so as to get closer to each other.

Figure 13:
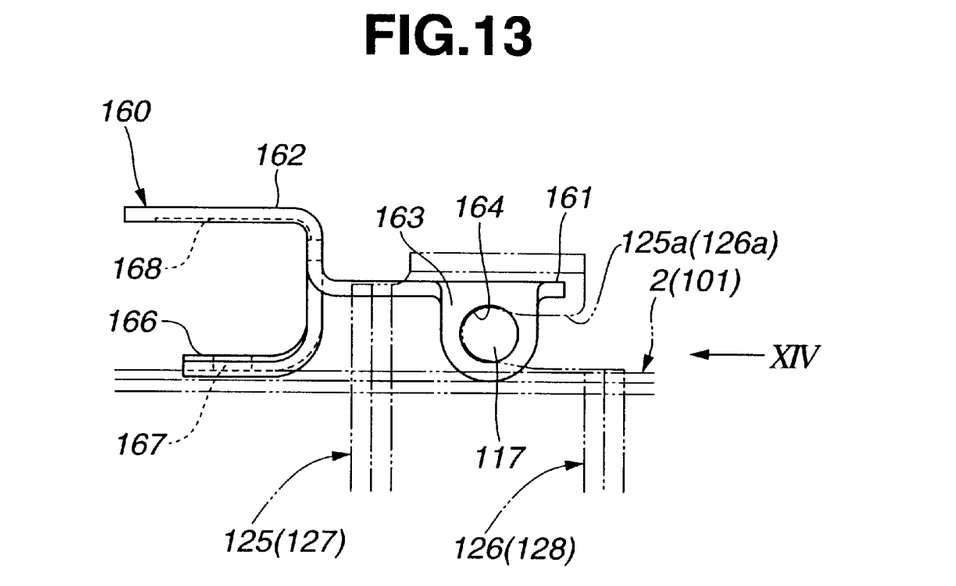
FIG. 13 is an elevational view of the rip plate of FIG. 12.

The distance brackets 125, 126 are generally U-shaped by bending and disposed movably between the sidewalls 114, 115 so as to sandwich the column jacket 101 between their inner surfaces. The distance brackets 125, 126 include webs 127, 128 that abut on the sidewalls 114, 115, pairs of flanges 129, 130, grooves 125a, 126a formed in the webs 127, 128, respectively. As shown in FIG. 13, the grooves 125a, 126a are elongated axially of the column jacket 101 and open at the steering wheel side. The distance brackets 125, 126 are coupled by a pin 131 and a push nut 132 so as to be able to get closer to each other upon deformation of the sidewalls 114, 115. The pin 131 is attached parallel to the column jacket 101 and positioned on the driver side (the lower side in FIG. 6) of the column jacket 101.

Figure 7:
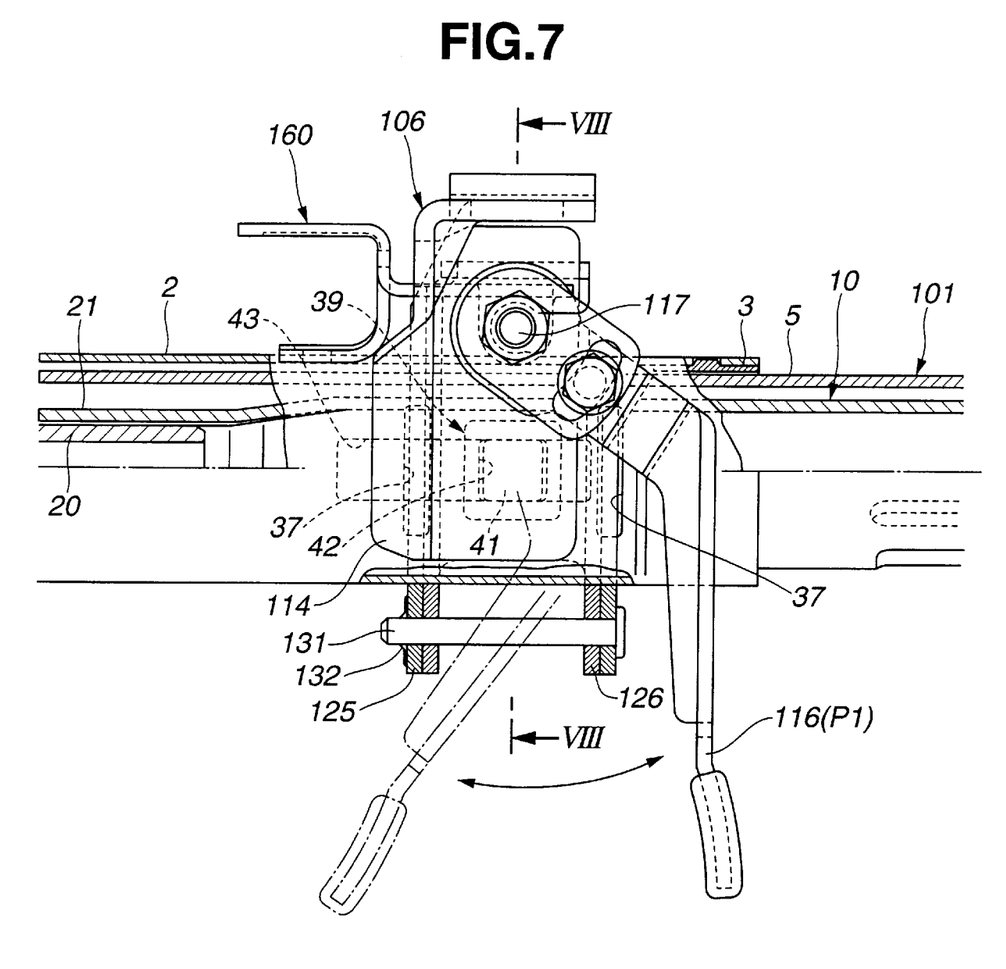
FIG. 7 is a partially enlarged view of the tilting and telescopic steering column assembly of FIG. 6.

The flanges 129, 130 include the lock protrusions 36 and the support protrusions 38, respectively, as in the case with the first embodiment. The lock protrusions 36 are allowed to directly contact with the upper jacket tube 5 through the slits 37 formed in the lower jacket tube 2, while the support protrusions 38 are allowed to contact directly with the outer surface of the lower jacket tube 2. The stopper block 39 is press fitted in the web 128 of the distance bracket 126 and includes the curved surface 40 and the guide protrusion 41, as shown in FIG. 7. The guide protrusion 41 protrudes through the rectangular hole 42 in the lower jacket tube 2 and is engaged in the telescoping adjustment hole 43 formed in the upper jacket tube 5.

A rip plate 160 for absorbing collision energy is provided to the lower jacket tube 5 adjacent the upper clamp 106. The rip plate 160 includes a support portion 161, a pair of flanges 163 provided with mounting holes 164 on both sides of the support portion 161, a rip portion 162, and a mounting portion 166, as shown in FIGS. 6 to 8, 12 to 14. Grooves 168 are formed in the rip portion 162 so as to be located on the opposite sides of the mounting portion 166 when observed in plan and extend from the root of the mounting portion 166. The rip plate 160 is mounted on the lower jacket tube 2 by welding at a welding section 167 of the mounting portion 166.

Figure 12:
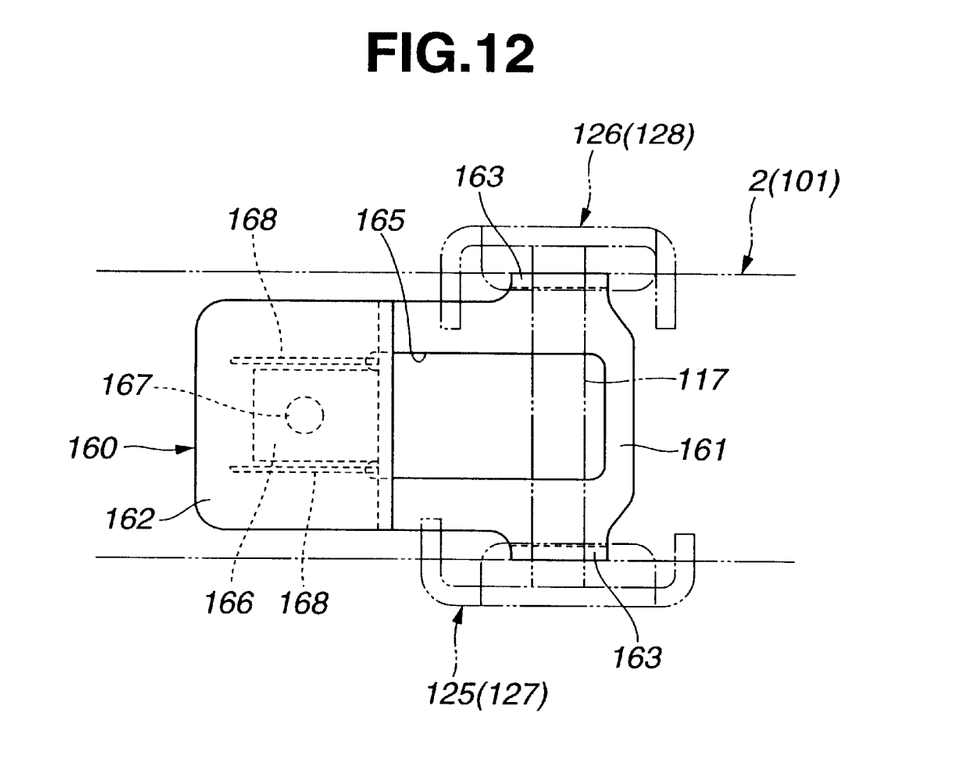
FIG. 12 is a top view of a rip plate of the tilting and telescopic steering column assembly of FIG. 6.
Figure 14:
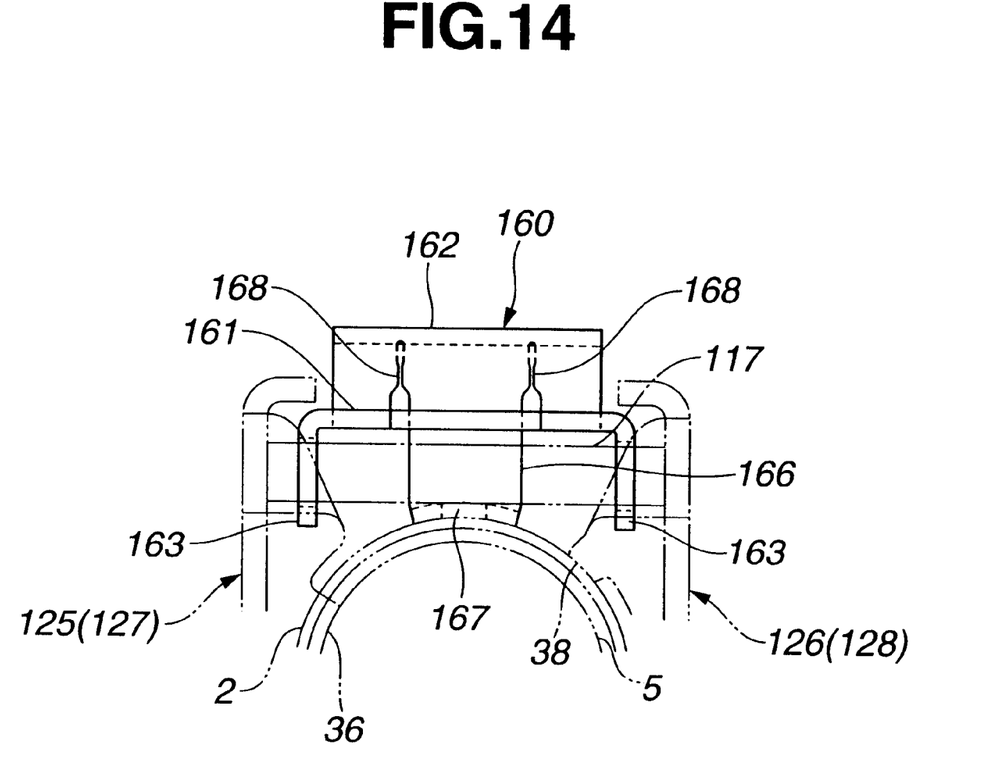
FIG. 14 is a view taken of the rip plate when viewed in the direction of an arrow XIV of FIG. 13.

The support portion 161, the flanges 163, the rip portion 162 and the mounting portion 166 are formed integrally by bending. Specifically, the support portion 161 and the rip portion 162 are bent into the shape of a crank in cross-section. The mounting portion 166 is formed by cutting a central portion of the support portion 161 corresponding to an opening 165 and bending the central portion to the rip portion side. Further, the mounting portion 166 is bent so as to fit the outer surface of the lower jacket tube 2.

Figure 8:
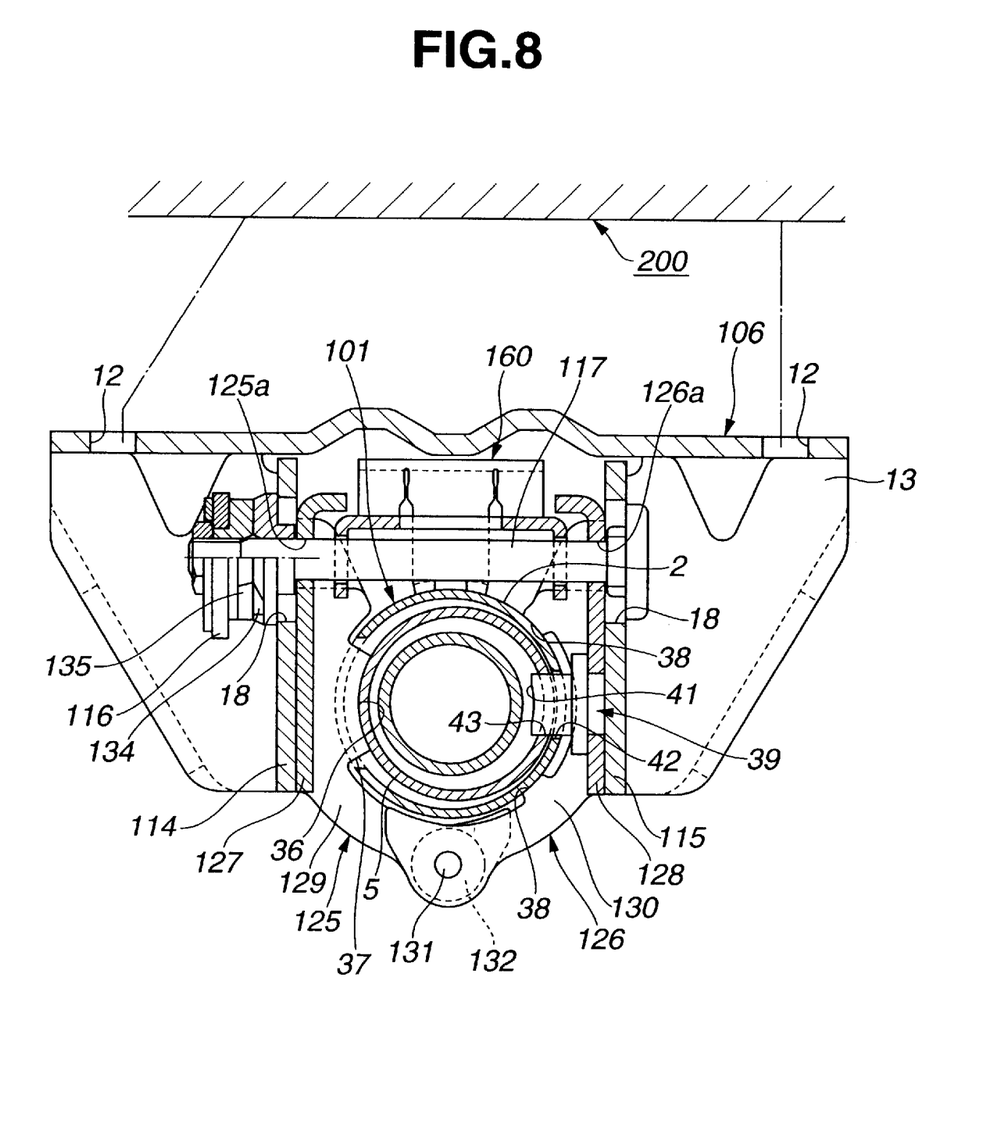
FIG. 8 is a sectional view of the tilting and telescopic steering column when taken along a line VIII—VIII of FIGS. 6 and 7.
Figure 9:
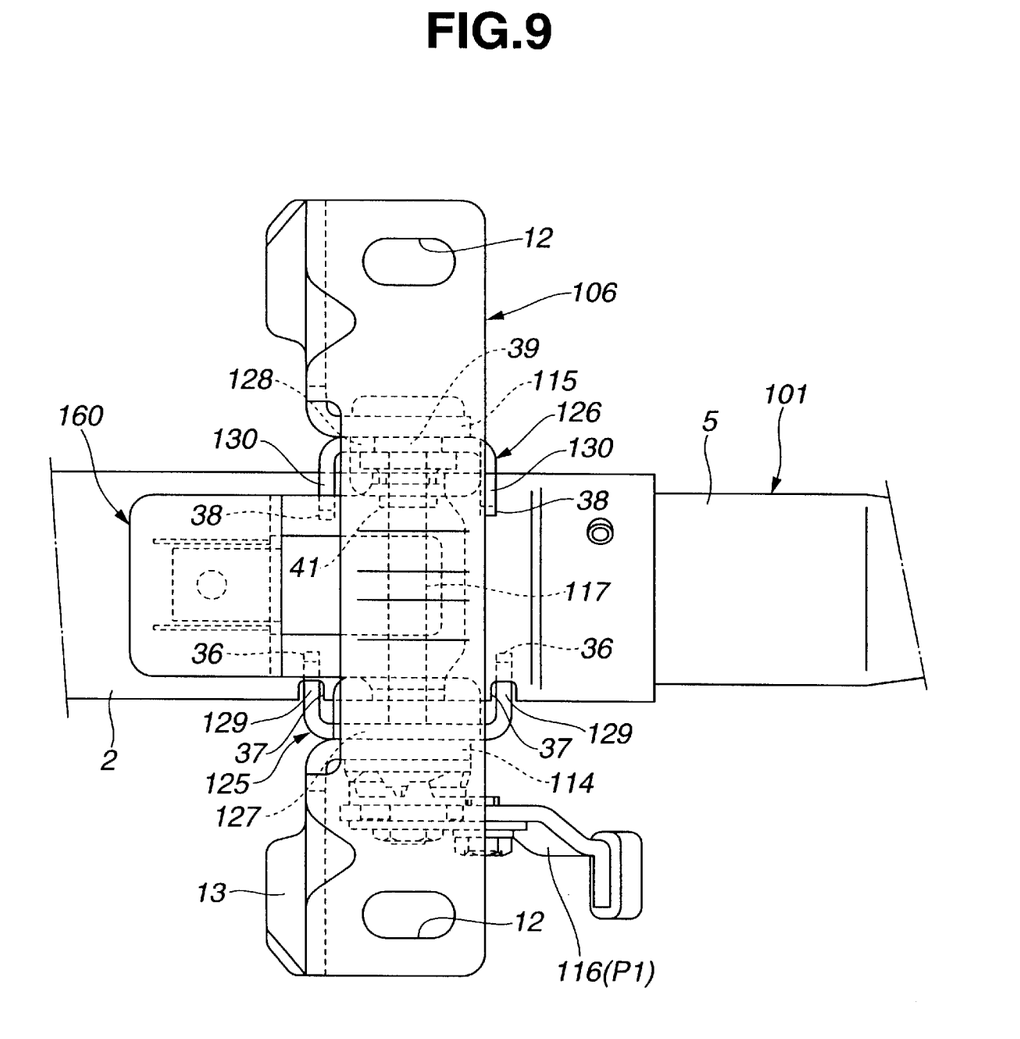
FIG. 9 is a top view of the tilting and telescopic steering column assembly of FIG. 7.

As shown in FIG. 8, the lock bolt 117 is unrotatably provided so as to pass through the tilt adjustment holes 18 of the sidewalls 114, 115, the grooves 125a, 126a of the distance brackets 125, 126 and the mounting holes 164 of the rip plate 160 on the vehicle body side (the lower side in FIG. 6) of the column jacket 101.

The operation lever 116 is attached to the lock bolt 117 so as to be movable between a lock position P1 and an unlock position P2 (shown in FIGS. 6 and 7). As the lock bolt 117 is positioned on the vehicle body side of the column jacket 101, the operation lever 116 is located further away from the driver in the second embodiment than the operation lever 16 in the first embodiment. It is thus possible to provide larger legroom for the driver in the second embodiment than in the first embodiment.

A cam follower 134 and a cam 135 are interposed between the sidewall 114 and the operation lever 116, and have cam surfaces held in contact with each other. The cam follower 134 is mounted on the lock bolt 17 for rotation together therewith and engaged in the tilt adjustment hole 18, while the cam 135 is press fitted in the operation lever 116 for rotation together therewith.

In the above-mentioned structure, collision energy due to secondary collision is transmitted from the steering wheel through the upper shaft member 21 and the upper jacket tube 5 to the lower jacket tube 2. Then, the distance brackets 125, 125 and the lower jacket tube 2 move together in the direction of the steering gear unit, while the lock bolt 117 comes out of the elongated holes 125a, 126a without moving together with the distance brackets 125, 126. The lower jacket tube 2 pulls the rip portion 162 through the mounting portion 166, but the flanges 163 are retained by the lock bolt 117. The rip portion 162 is thus ripped through the grooves 168, thereby absorbing the collision energy.

As described above, the second embodiment is similar in structure and function to the first embodiment, except for the rip plate 160 and the placement of the lock bolt 117 and the pin 131 in relation to the column jacket 101. Thus, the steering column assembly of the second embodiment can prevent and allow tilting and telescopic movements of the column jacket 101 and of the steering shaft 10 to thereby lock and unlock the steering wheel by moving the operation lever 116 between the lock position P1 and the unlock position P2 in the same manner as the first embodiment.

Figure 11:
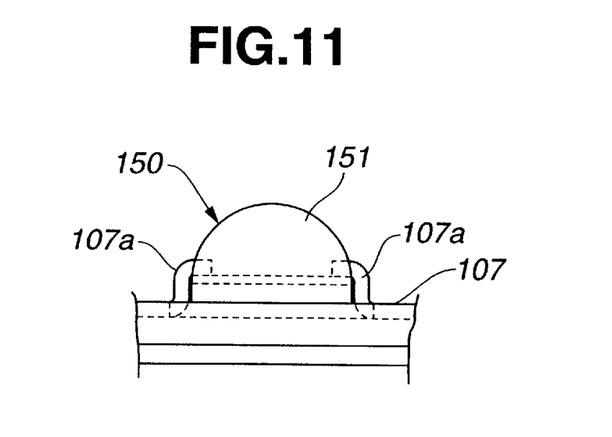
FIG. 11 is a partial bottom view of the tilting and telescopic steering column assembly of FIG. 10.

Herein, a resinous stopper 150 is employed in place of the stopper pin 50 of the first embodiment, as shown in FIGS. 6, 10 and 11. The stopper 150 includes a support portion 151 and a pair of holding portions 152 formed integral with the support portion 151, and is inserted into the lower shaft member 20. The stopper 150 is coupled to the lower clamp 107 by fitting the support portion 151 into the hook portions 107a of the lower clamp 107 while supporting the lower shaft member 20 between the holding portions 152. By the use of the stopper 150, the lower shaft member 20 is prevented from falling off from the steering column assembly in the process of distributing the steering column assembly. The stopper 150 is taken away when the steering column assembly is attached to the vehicle body 200.

Although the invention has been described with reference to a specific embodiment of the invention, the invention is not limited to the above-described embodiment. Various modification and variation of the embodiment described above will occur to those skilled in the art in light of the above teaching. For example, the lock bolt 17 (or the lock bolt 117) may be provided with a threaded portion so as to create pressure on the sidewalls 14, 15 (or the sidewalls 114, 115), the distance brackets 25, 26 (or the distance brackets 125, 126) due to its screw motion upon operating the operation lever 16 (or the operation lever 116). The scope of the invention is defined with reference to the following claims.

What is claimed is:
1. A steering column assembly for a vehicle, comprising:
   a column jacket having upper and lower jacket tubes telescopically coupled with each other;

a steering shaft rotatably supported in the column jacket and capable of tilting and telescoping together with the column jacket;

upper and lower clamps mounting the column jacket on a vehicle body in such a manner that the column jacket can tilt about a lower end portion of the lower jacket tube;

the upper clamp having a pair of opposed sidewalls and first and second distance brackets disposed movably between the sidewalls so as to sandwich the column jacket therebetween, the first distance bracket including a lock portion engageable with an outer surface of the upper jacket tube, the second distance bracket including a support portion engageable with an outer surface of the lower jacket tube; and an operation lever attached to the upper clamp so as to be able to pivot between a lock position and an unlock position, wherein, when the operation lever is at the lock position, the sidewalls is caused to press the first and second distance brackets against the column jacket with the lock portion pushed on the upper jacket tube and the support portion pushed on the lower jacket tube so that both of the column jacket and the steering shaft are prevented from tilting and telescoping.

2. A steering column assembly according to claim 1, wherein the first distance bracket includes a second lock portion spaced from the first mentioned lock portion in an axial direction of the column jacket, and the second distance bracket includes a second support portion spaced from the first mentioned lock portion in the axial direction of the column jacket.

3. A steering column assembly according to claim 1, wherein the upper jacket tube defines therein an elongated telescoping adjustment hole, and the second distance bracket further includes a stopper member engaged in the telescoping adjustment hole.

4. A steering column assembly according to claim 1, wherein the first and second distance brackets are coupled by a pin, the pin and a pivot center of the operation lever are placed on radially opposite sides of the column jacket so that the pivot center is located nearer to the vehicle body, and the pin is attached in parallel with the column jacket.

5. A steering column assembly for a vehicle, comprising:
a column jacket having upper and lower jacket tubes telescopically coupled with each other and supporting therein a steering shaft rotatably;

a clamp mounting the column jacket tiltably on a vehicle body, the clamp having a pair of opposed sidewalls and first and second distance brackets disposed movably between the sidewalls so as to sandwich the column jacket therebetween, the first distance bracket having a lock portion engageable with an outer surface of the upper jacket tube, the second distance bracket having a support portion engageable with an outer surface of the lower jacket tube; and control means for pushing the sidewalls thereby pressing the first and second distance brackets against the column jacket with the lock portion pushed on the upper jacket tube and the support portion pushed on the lower jacket tube so that the column jacket is prevented from tilting and telescoping when an operation lever is in a lock position.

6. A steering column assembly according to claim 5, wherein the first distance bracket further includes a second lock portion spaced from the first mentioned lock portion in an axial direction of the column jacket, and the second distance bracket includes a second support portion spaced from the first mentioned support portion in the axial direction of the column jacket.

7. A steering column assembly according to claim 6, wherein each of the lock portions and the support portions is in a form of a protrusion.

8. A steering column assembly according to claim 5, wherein the control means causes the sidewalls to become deformed under pressure thereby causing the first and second distance brackets to be pressed and come closer to each other when the operation lever is in the lock position.

9. A steering column assembly according to claim 8, wherein the first and second distance brackets are coupled by a pin.

10. A steering column assembly according to claim 9, wherein the pin and a pivot center of the operation lever is placed on radially opposite sides of the column jacket so that the pivot center is located nearer to the vehicle body.

11. A steering column assembly according to claim 8, wherein the control means includes a cam mechanism for creating the pressure on the sidewalls.

12. A steering column assembly according to claim 5, wherein the upper jacket tube defines therein an elongated telescoping adjustment hole, and the second distance bracket further includes a stopper member engaged in the telescoping adjustment hole.

13. A steering column assembly according to claim 5, further comprising a rip plate attached to the lower jacket tube for absorbing shock due to secondary collision.

14. A clamp for mounting a column jacket tiltably on a vehicle body, the column jacket having upper and lower jacket tubes telescopically coupled with each other, the clamp comprising:
a pair of opposed sidewalls;

first and second distance brackets disposed movably between the sidewalls so as to sandwich the column jacket therebetween, the first distance bracket including a lock portion engageable with an outer surface of the upper jacket tube, the second distance bracket including a support portion engageable with an outer surface of the lower jacket tube; and control means for pushing the sidewalls thereby pressing the first and second distance brackets against the column jacket with the lock portion pushed on the upper jacket tube and the support portion pushed on the lower jacket tube so that the column jacket is prevented from tilting and telescoping when an operation lever is in a lock position.

15. A clamp according to claim 14, wherein the first distance bracket further includes a second lock portion spaced from the first mentioned lock portion in an axial direction of the column jacket, and the second distance bracket further includes a second support portion spaced from the first mentioned lock portion in the axial direction of the column jacket.

16. A clamp according to claim 15, wherein each of the lock portions and the support portions is in a form of a protrusion.

17. A clamp according to claim 14, wherein the control means causes the sidewalls to become deformed under pressure thereby causing the first and second distance brackets to be pressed and come closer to each other when the operation lever is in the lock position.

18. A clamp according to claim 17, wherein the first and second distance brackets are coupled by a pin.

19. A steering column assembly according to claim 18, wherein the pin and a pivot center of the operation lever is placed on radially opposite sides of the column jacket so that the pivot center is located nearer to the vehicle body.

20. A clamp according to claim 17, wherein the control means includes a cam mechanism for creating the pressure on the sidewalls.

21. A clamp according to claim 14, wherein the upper jacket tube defines therein an elongated telescoping adjustment hole, and the second distance bracket further includes a stopper member engaged in the telescoping adjustment hole.

* * * * *